(12) United States Patent
Beck

(10) Patent No.: US 7,923,652 B1
(45) Date of Patent: Apr. 12, 2011

(54) ACTIVATION DEVICE

(76) Inventor: William Harold Beck, Fairfield, IL (US)

( * ) Notice: Subject to any disclaimer, the term of this patent is extended or adjusted under 35 U.S.C. 154(b) by 308 days.

(21) Appl. No.: 11/823,151

(22) Filed: Jun. 26, 2007

Related U.S. Application Data

(60) Provisional application No. 60/817,480, filed on Jun. 28, 2006.

(51) Int. Cl.
*H01H 3/00* (2006.01)

(52) U.S. Cl. .................. 200/332.2; 200/522; 200/61.85; 200/329

(58) Field of Classification Search .............. 200/43.01, 200/43.16–43.18, 52 R, 61.85, 522, 505, 200/573, 574, 293.1, 298, 329, 321, 322, 200/332.2, 334, 552, 518, 519; 74/523, 543, 74/553, 471 R, 473.3, 473.33, 473.36, 479.01, 74/491, 520, 527, 559
See application file for complete search history.

(56) References Cited

U.S. PATENT DOCUMENTS

| | | | | |
|---|---|---|---|---|
| 1,703,724 A * | 2/1929 | Crispen | ......................... | 200/519 |
| 2,408,502 A * | 10/1946 | Writzmann | ................ | 200/332.2 |
| 2,984,724 A * | 5/1961 | Merz | ......................... | 200/332.2 |
| 3,614,686 A * | 10/1971 | Ellis | .............................. | 335/167 |
| 4,174,473 A * | 11/1979 | Brenneman | ................ | 200/332.2 |
| 4,520,247 A * | 5/1985 | Pancook et al. | ............... | 200/298 |
| 4,857,681 A * | 8/1989 | Rush et al. | ................. | 200/61.85 |
| 4,900,881 A * | 2/1990 | Fischer | ...................... | 200/61.85 |
| 4,981,121 A * | 1/1991 | Tani | ............................ | 123/179.1 |
| 5,161,679 A * | 11/1992 | Russo | ........................ | 200/43.17 |
| 5,436,419 A * | 7/1995 | Welscher et al. | ........... | 200/61.88 |
| 6,078,015 A * | 6/2000 | Martinez | ..................... | 200/61.85 |

\* cited by examiner

*Primary Examiner* — Michael A Friedhofer
(74) *Attorney, Agent, or Firm* — Mark A. Mangey; George H. Morgan

(57) ABSTRACT

An activation device useful for drag racers comprising a body, a trigger, a cocking pressure spring plunger set screw, a trigger tension spring plunger set screw, a trigger tension jam nut, a body cover, cocking safety button, screws, a microswitch, a wave washer, and a trigger set screw.

The body comprises a trigger pivot post, a wiring channel, a wiring aperture, and a recess surface.

The trigger comprises a trigger pivot post aperture, a trigger released position notch, a trigger cocked position notch, and a cocking channel.

18 Claims, 11 Drawing Sheets

ACTIVATION DEVICE

CROSS REFERENCES TO RELATED APPLICATIONS

Provisional Application for Patent No. 60/817,480, filed Jun. 28, 2006, with the same title, "Activation Device", which is hereby incorporated by reference. Applicant claims priority pursuant to 35 U.S.C. Par. 119 (e) (i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to an activation device for activation of an electronic delay box such as is used in vehicle drag racing.

2. Background Information

In basic terms, a drag race is an acceleration contest from a standing start between two vehicles over a measured distance at a specifically designed drag race facility. The accepted standard for that distance is either a quarter mile or an eighth mile. These contests are typically started by means of an electronic device called a "Christmas Tree". Upon leaving the starting line, each contestant activates a timer that is stopped that contestant's vehicle reaches the finish line. The start-to-finish time is the vehicle's E.T. (elapsed time), which serves to measure performance and often serves to determine handicaps during competition.

A popular form of drag racing is a handicapped form of competition known as "E.T. Bracket Racing". In this form of racing, two vehicles of varying performance potentials can race on a potentially even basis. The anticipated elapsed times for each vehicle are compared, with the slower car receiving a head start equal to the difference of the two. With this system, virtually any two vehicles can be paired in a competitive drag race.

For example, a car A has been timed at 17.78, 17.74, and 17.76 seconds on a given quarter mile track, and the car A driver feels that a "dial-in" of 17.75 seconds is appropriate. Meanwhile, a car B has been timed at 15.27, 15.22, and 15.26 seconds for the same quarter mile track, and the car B driver has opted for a "dial-in" of 15.25 seconds. Accordingly, the car A will get a 2.5 second lead start over the car B when the "Christmas Tree" counts down to each car's starting green light.

If both vehicles cover the quarter mile distance in exactly the predetermined elapsed time, the win will go to the driver who reacts the quickest to the starting signal. That reaction to the starting signal is called "reaction time". Both lanes are timed independently of one another, and the clock does not start for a given vehicle until the vehicle actually moves. Because of this, a vehicle may sometimes appear to have a mathematical advantage in comparative elapsed times, but actually lose the race. This makes starting line reflexes extremely important in drag racing.

The "box" as it is usually called, is an electronic device to aid the driver. A driver can "dial a number into the box, called the delay. Usually used in conjunction with a transmission brake and two-step, a driver can hold down a button mounted on a steering wheel, activating the transmission brake and the two step, and then let go of the button the instant the driver sees the first flash of amber from a first bulb of the "Christmas Tree". The delay box will then count the thousandths of a second dictated by the driver and then release the transmission brake and two-step.

A driver can adjust his reaction times by changing the number dialed into the delay box. The theory is that a driver instinctively reacting to an initial signal (the first amber) will be quicker and more consistent than a driver that must train himself or herself to wait for the third amber light. This is indeed often the case, making the "box" a controversial, but legal, tool in many classes of competition.

Current art is that delay boxes use a pushbutton to activate. The pushbutton is usually mounted on the vehicle steering wheel or floor, close to the driver of the vehicle. The driver holds the pushbutton down with a thumb or a finger, until it is time to release the button. The driver then releases the button as quickly as possible, usually by jerking a hand away, using mostly the arm bicep muscles.

As will be seen by the subsequent description of the preferred embodiments of the present invention, the present invention overcomes shortcomings of prior art.

SUMMARY OF THE INVENTION

The preferred embodiment of the present invention, an activation device comprises a body, a trigger, a cocking pressure spring plunger set screw, a trigger tension spring plunger set screw, a trigger tension jam nut, a body cover, a cocking safety button, socket head cap screws, flat head screws, a microswitch, a wave washer, and a trigger set screw.

The body comprises a trigger pivot post, a wiring channel, a wiring aperture, a trigger recess region, a top surface, and a bottom surface.

The trigger comprises a trigger pivot post aperture, a trigger released position notch, a trigger cocked position notch, a cocking channel, and a cocking lever.

The microswitch comprises a switch actuator, and electrical wiring.

DESCRIPTION OF THE PREFERRED EMBODIMENTS

Figure 1:
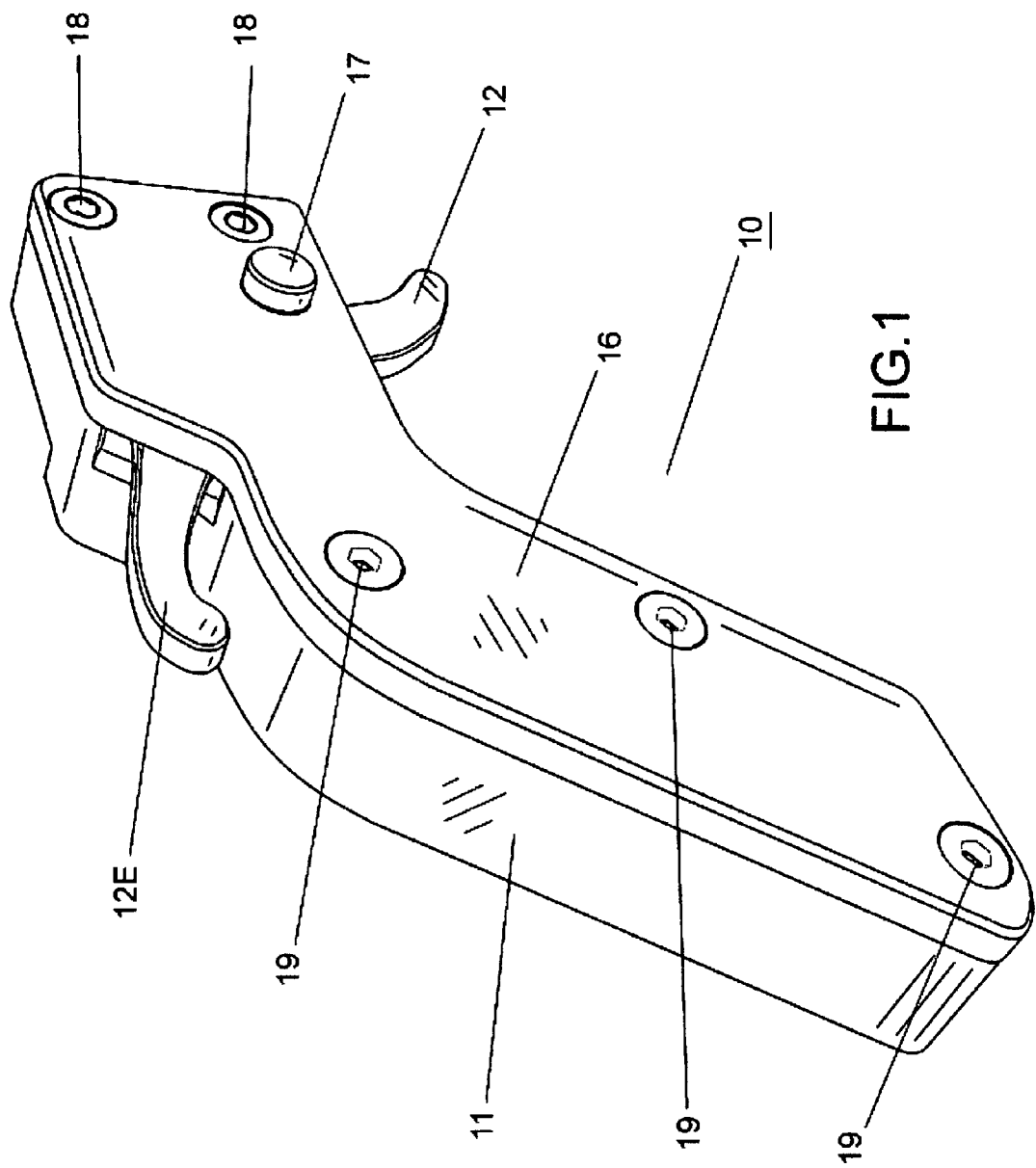
FIGS. 1 through 4 illustrate the preferred embodiment of the present invention, an activation device.
Figure 2:
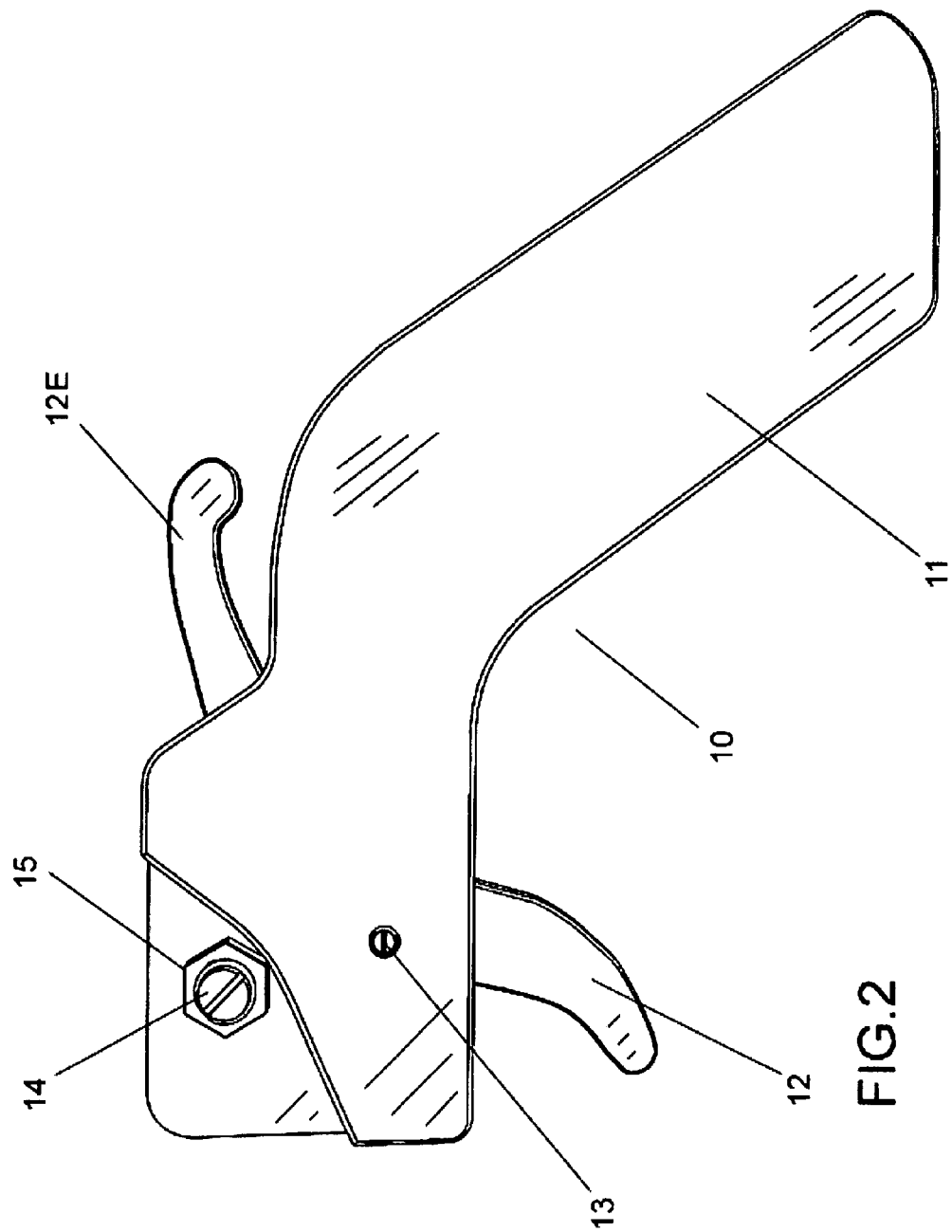
Figure 3:
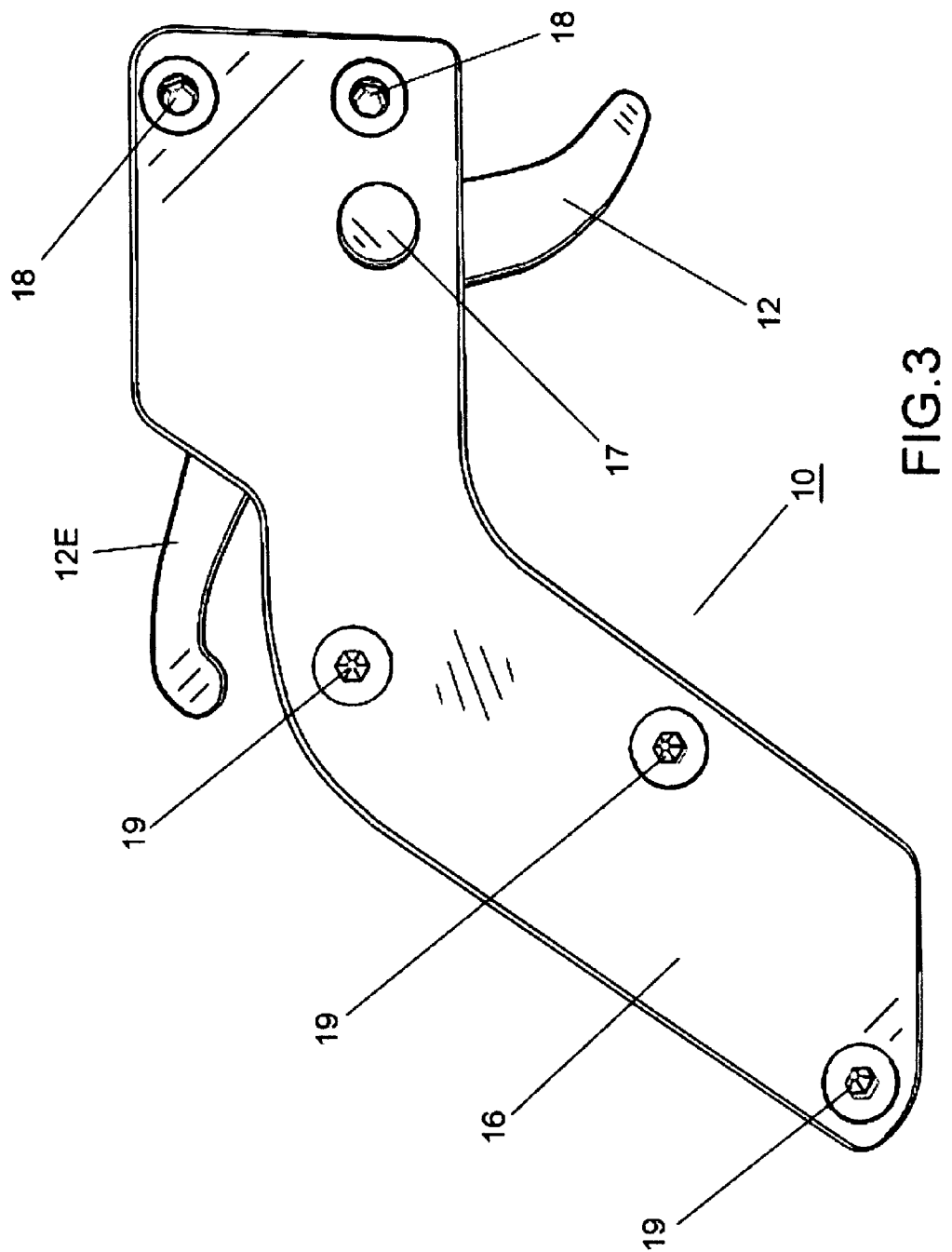
Figure 4:
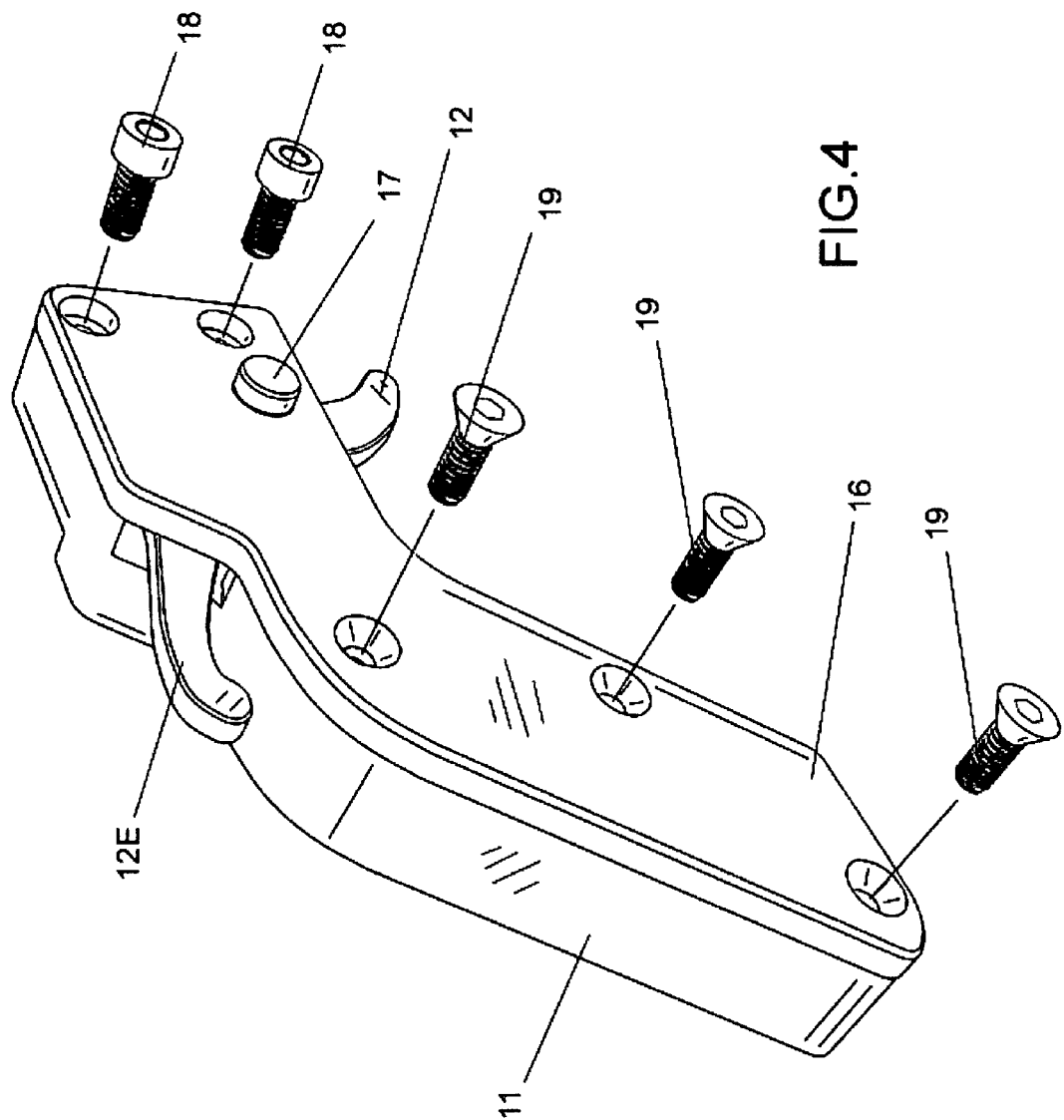
Figure 5:
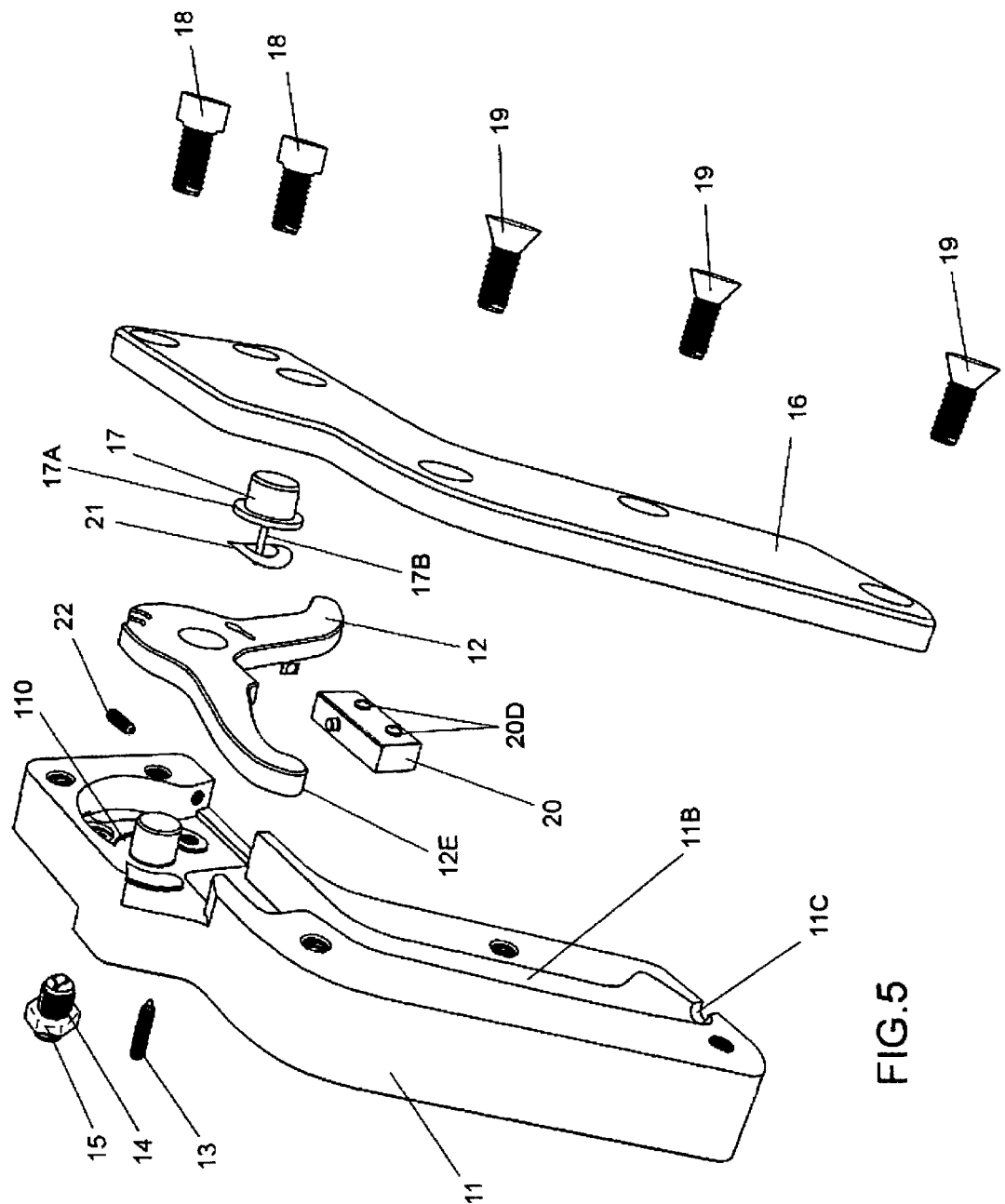
FIG. 5 is an exploded view of the activation device.

Referring to the FIGS. 1 through 5, the preferred embodiment of the present invention, an activation device 10 comprises a body 11, a trigger 12, a cocking pressure spring plunger set screw 13, a trigger tension spring plunger set screw 14, a trigger tension jam nut 15, a body cover 16, a cocking safety button 17, socket head cap screws 18, flat head screws 19, a microswitch 20, a wave washer 21, and a trigger set screw 22.

The body 11 comprises a trigger pivot post 11A, a wiring channel 11B, a wiring aperture 11C, a trigger recess region 11D, a top surface 11E, and a bottom surface 11F. The trigger 12 comprises a trigger pivot post aperture 12A, a trigger released position notch 12B, a trigger cocked position notch 12C, a cocking channel 12D, and a cocking lever 12E.

The microswitch 20 comprises a switch actuator 20A and wiring 20B.

Figure 6:
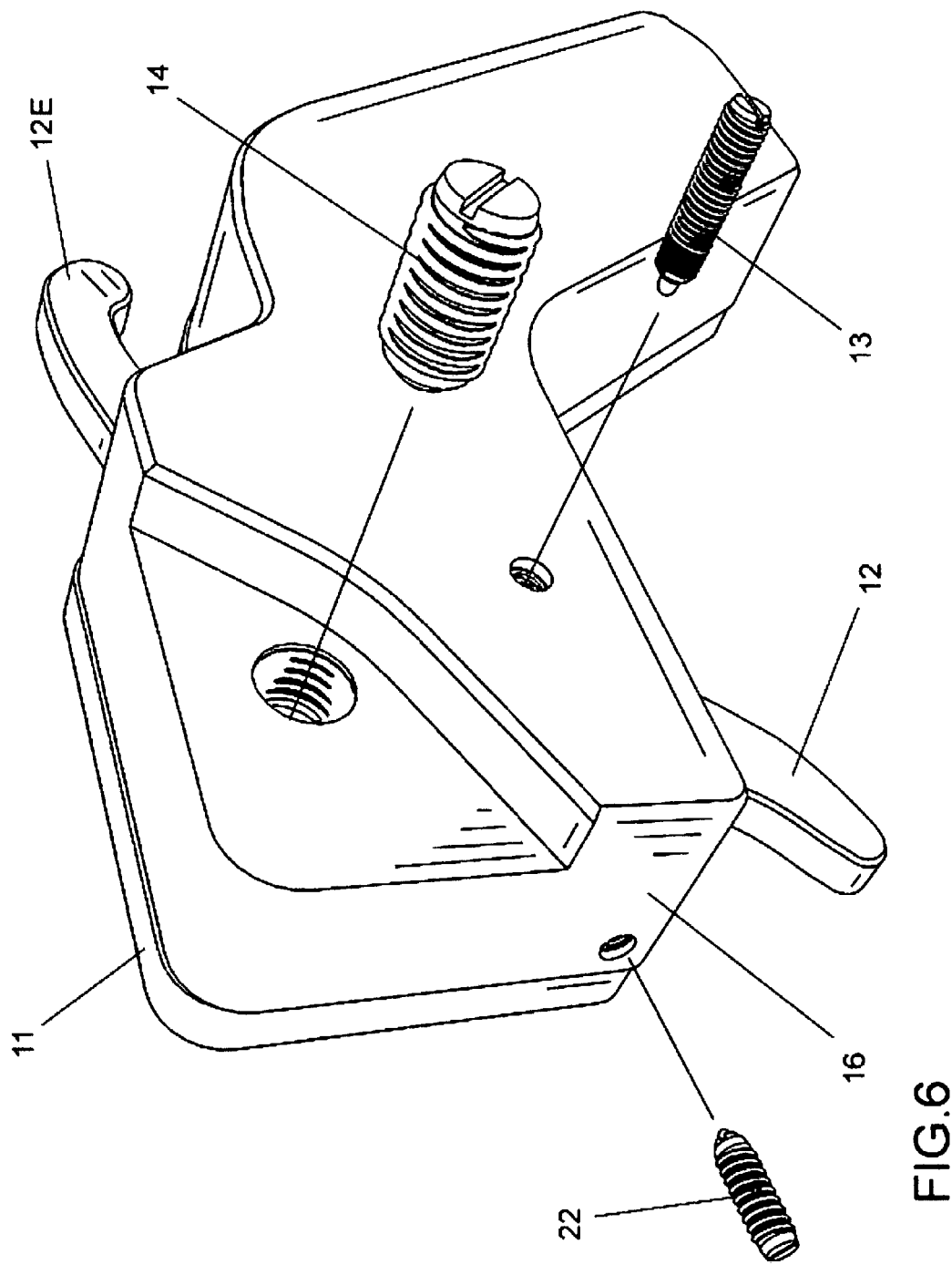
FIGS. 6 through 10 illustrate details of the activation device.
Figure 7:
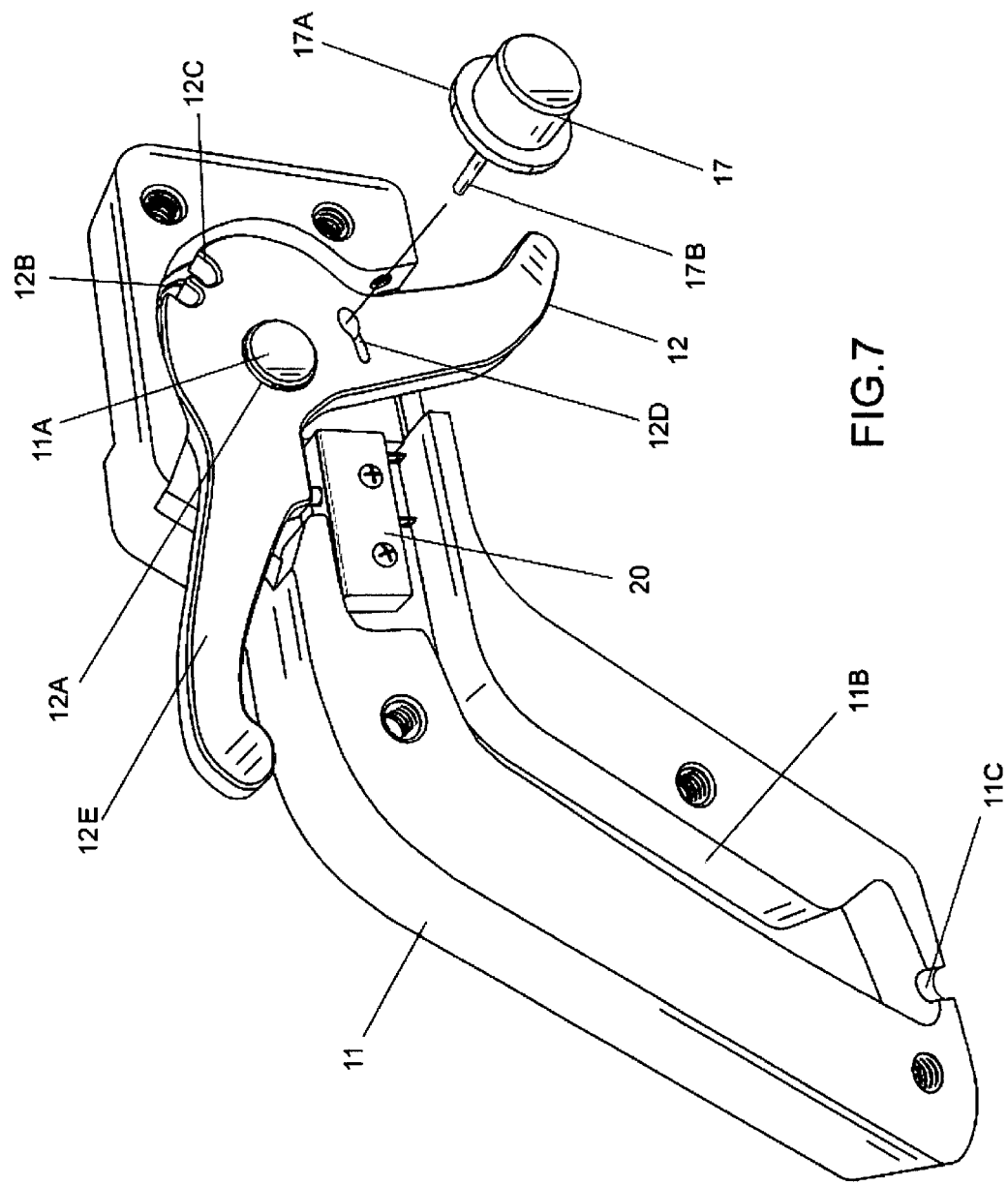
Figure 8:
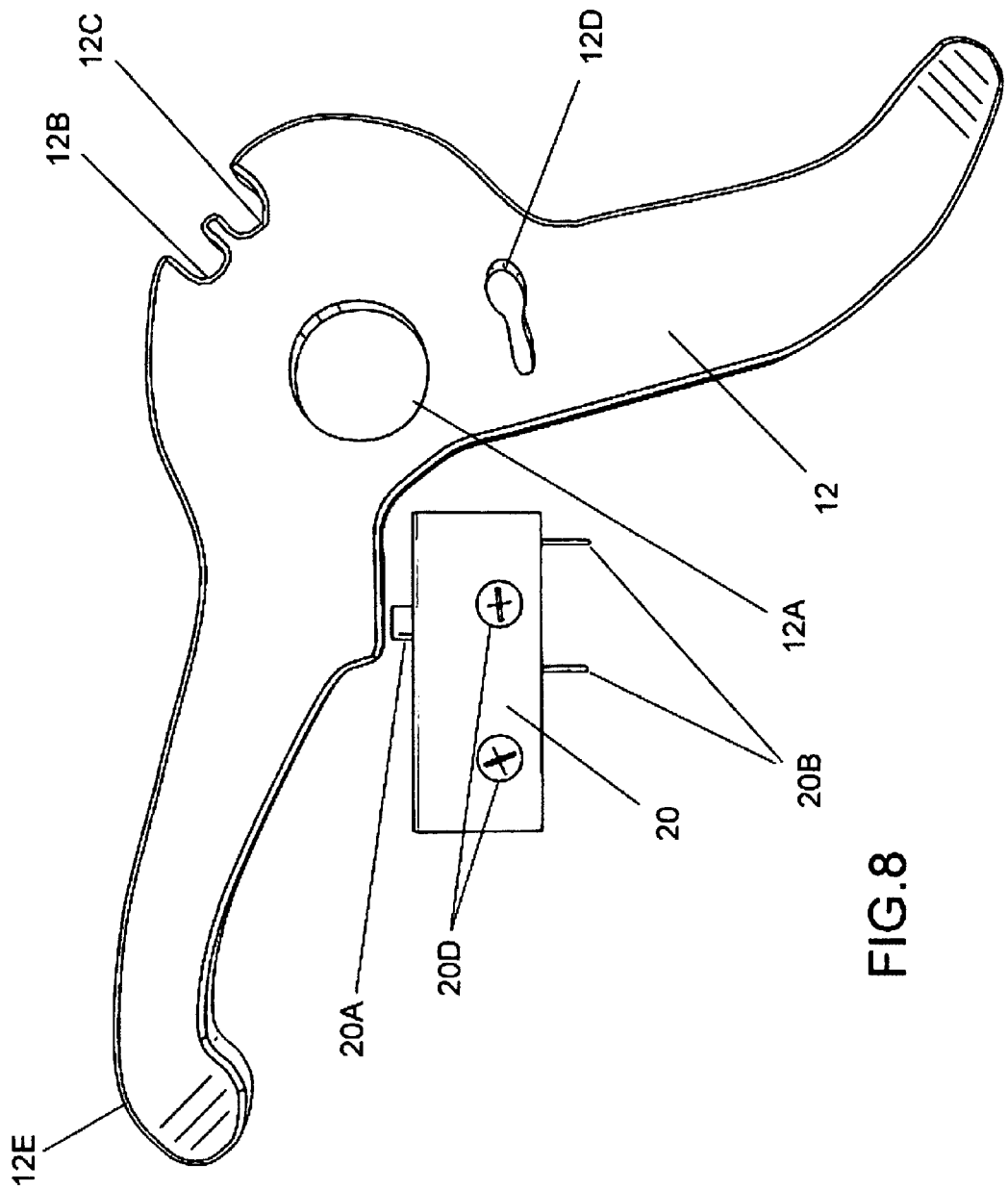
Figure 9:
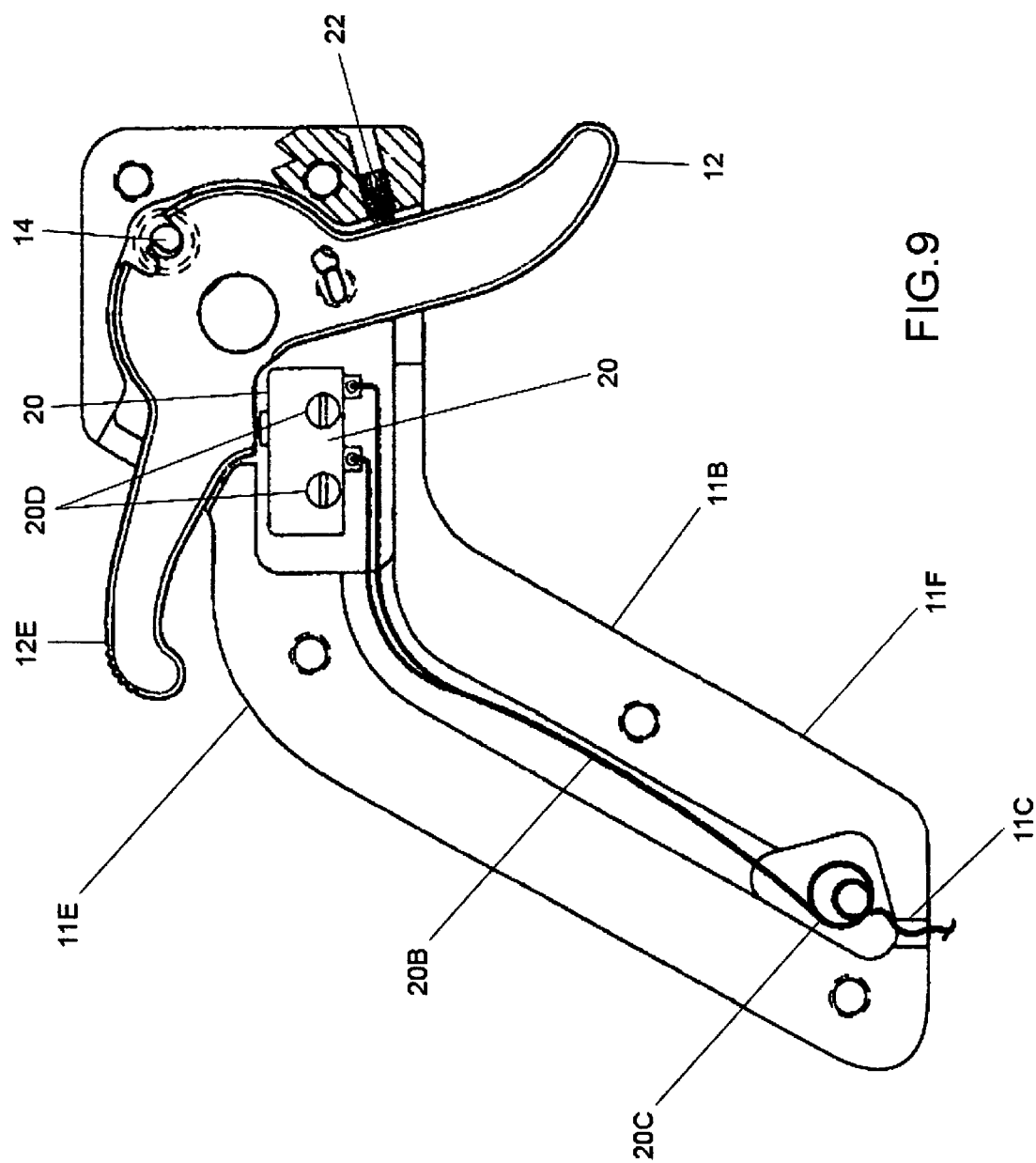
Figure 10:
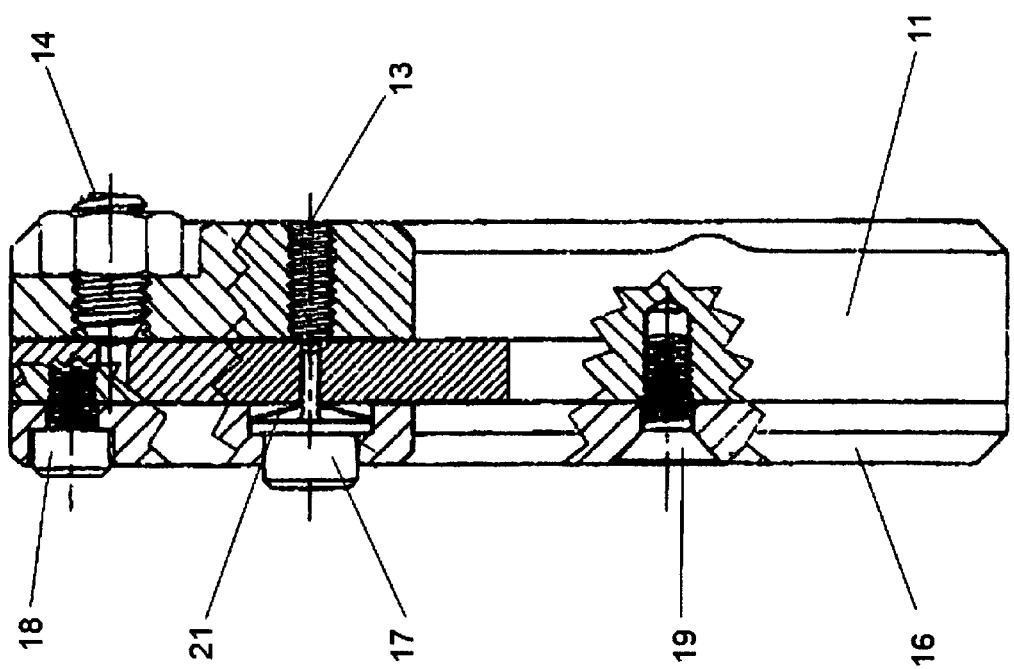

Referring also to FIGS. 6 though 10, assembly instructions are as follows:

1. Using pan head screws 20D, install the microswitch 20 in the body 11 with the wiring 20B threaded through the wiring channel 11B and out through the wiring aperture 11C. A knot 20C is tied in wiring 20B just before reaching the wiring aperture 11C.

2. A small amount of grease is applied to the trigger pivot post aperture 12A of the trigger 12 and then the trigger 12 is installed on the trigger pivot post 11A of the body 11. Check the trigger 12 is just below flush with the top surface 11E of the body 11. If the trigger 12 sits high, check the body 11 and the trigger 12 for chips and gouges. The trigger 12 should have free rotational movement about trigger pivot post 11A.

3. Install the cocking safety button 17 with the wave washer 21 into the body cover 16 and then assemble the body cover 16 with the cocking safety button 17 and the wave washer 21 on to the body 11, taking care that the small diameter pin 17B of said button 17 is in the cocking channel 12D of the trigger 12. Install one of the flat head screws 19 nearest to the bottom surface 11F of the body 11 and one of the socket head cap screws 18 nearest to the top surface 11E of the body 11. Then install the remaining said screws 18 and 19, tightened to approximately 15 inch pounds of torque.

4. Apply a small amount of LOCTITE™ thread locker to the trigger set screw 22 and install the trigger set screw 22 into the body 11 while gently holding the trigger 12 against the switch actuator 20A of the microswitch 20. Adjust the trigger set screw 22 until the switch actuator 20A clicks. Press downward against the cocking lever 12E of the trigger 12 so the trigger 12 is firmly against the trigger set screw 22 to ensure the microswitch 20 is actuating at a proper screw setting. Use of a multi-meter is to confirm operation of switch 20 is recommended for best results. The set screw 22 prevents the micro switch 20 from too great a force that might be applied.

5. Assemble the trigger tension jam nut 15 on to the trigger tension spring plunger set screw 14. Install the set screw 14 into the body 12 until firm contact is felt. Do not over tighten which would damage the spring plunger (not shown) in said set screw 14. While holding said set screw 14 in position, tighten said jam nut 15 to the body 12. The set screw 14 should be tight enough that the plunger end engages notches 12B and 12C but loose enough that the plunger will compress to allow movement of the trigger 12 such that the plunger will over ride a notch 12 B or 12C and then engage the next notch 12B or 12C. While the trigger 12 is firmly against the trigger set screw 22, said set screw 14 is seated in trigger cocked position notch 12C. The trigger 12 is said to be cocked. When the trigger 12 is pulled, so that the cocking lever 12E is moved upward, away from the body 12, so that the trigger 12 is moved away from the trigger set screw 22, pivoting around the trigger pivot post 11A, so that the microswitch 20 switch actuator 20A is released, said set screw 14 will seat in the trigger released position notch 12B. In this position, the trigger 12 is said to be fired. The trigger 12 should move freely between the fired and hold in the cocked and fired positions. If not, adjust said set screw 14 as required.

6. Install the cocking pressure spring plunger set screw 13 into the body 12 until point contact is made with the trigger 12. Do not overtighten or the spring plunger (not shown) of the cocking pressure spring plunger set screw 13 may be damaged. Back said set screw 13 approximately ⅛ turn. Check operation of the cocking safety button 17 to ensure that the trigger 12 is locked in the fired position. Press said button 17 and press down on the cocking lever 12E, i.e. cock the trigger 12 to check freedom of movement.

7. Check actuation of the switch actuator 20A of the microswitch 20 with a multimeter. Adjust said set screws 13, 14, and 22 as necessary. Set assembly aside for LOCTITE to set up.

Figure 11:
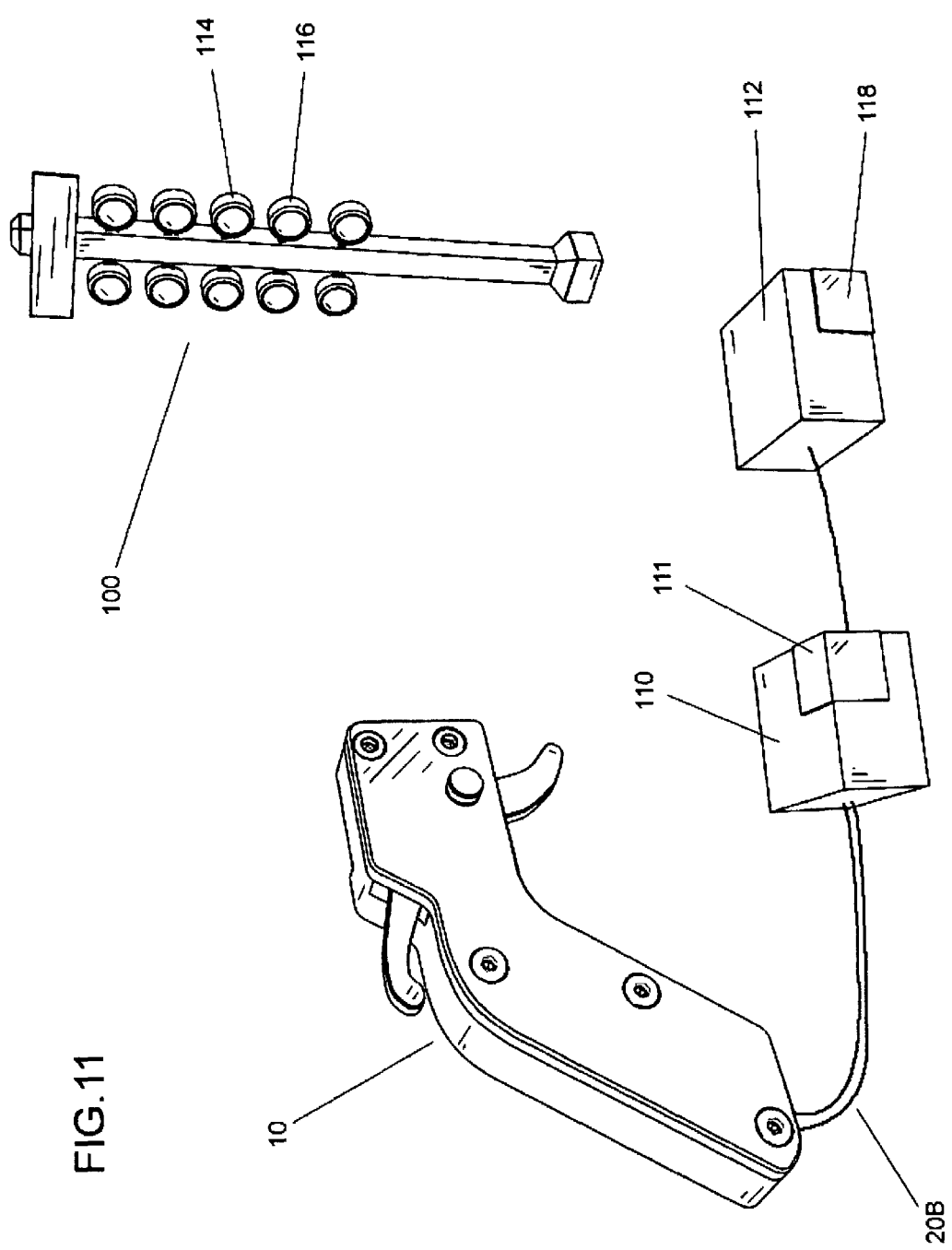
FIG. 11 shows the activation device used in an activation system.

FIG. 11 shows the race control system including the trigger device 10, which can send a start signal along wires 20B to a control box 110. The start signal can be sent in response to the lighting of a particular staging light 116 on a drag race Christmas tree 114. The control box 110 can include a timing device 111 that can provide a delay after receiving the start signal from the trigger device 10 prior to sending a signal to start a car 112 by releasing a brake 118 for example.

Starting a car 112 by releasing a brake 118 allows the car 112 to make a faster start.

In operation, one cocks the activation device 10 by pressing on the cocking safety button 17, which causes the small diameter pin 17A to displace the cocking pressure spring plunger set screw 13 from the larger diameter portion of the cocking channel 12D, which then permits the trigger 12 to be rotated into a cocked position by pressing downward on the cocking lever 12E. The small diameter pin 17A will then be in the small portion of channel 12D. The trigger 12 engages the switch actuator 20A of the microswitch 20. When a race car driver pulls the trigger 12, the switch actuator 20A is released and an electrical signal passes through the wiring 20B to the prior art "box" previously discussed in the prior art section. As the trigger 12 is pulled the ball portion of spring plunger 14 rides out of notch 12B and will spring lock into the fired notch 12C.

Once the trigger 12 is pulled, it is locked in the fired position by the cocking pressure spring plunger set screw 13 plunging into the cocking channel 12D. It is important to keep the trigger 12 locked in the fired position during a drag race so as to avoid disruption of the switch actuator 20A setting.

The trigger tension spring plunger set screw 14 seated in either of said notches 12B or 12C serve to keep the trigger 12 in a given position, cocked or fired, whichever the case may be, until moved by an operator, either by cocking or firing as desired.

Only trigger finger muscles are involved at the start of the race, as opposed to arm biceps, so reaction time is reduced for drag racers.

The trigger 12 is A 2 tool steel, in the preferred embodiment of the invention.

The body 11 and the body cover 12 are of gold anodized aluminum in the preferred embodiment of the invention.

The trigger recess surface 11D in the body 12 is to reduce the chance of galling between the body 11 and the trigger 12.

The microswitch 20 is a MICRON 11SM22, which is known in the trade in the preferred embodiment of the invention.

Although the description contains many specificities, these should not be construed as limiting the scope of the invention but as merely providing illustrations of some of the presently preferred embodiments of this invention.

It will be obvious to those skilled in the art that modifications may be made to the embodiments described above without departing from the scope of the present invention.

For example, the preferred embodiment of the present invention utilizes a wave washer as a spring to bias force against the cocking safety button 17. As obvious to anyone skilled in the art, there are other ways to induce a force bias against a push button, such as, but not restricted to coil springs and spring levers, to name two.

Thus the scope of the invention should be determined by the appended claims in the formal application and their legal equivalents, rather than by the examples given.

I claim:

1. An activation device comprising:
   a) a body;
   b) a trigger;
   c) a cocking pressure spring plunger set screw;
   d) a trigger tension spring plunger set screw;
   e) a trigger tension jam nut;
   f) a body cover;
   g) a cocking safety button;
   h) a microswitch; and
   i) a trigger set screw;
   wherein the body comprises a trigger pivot post, a wiring channel, a wiring aperture, a top surface, and a bottom surface;
   wherein the trigger comprises trigger pivot post aperture, a cocking channel, and a cocking lever;
   wherein the cocking safety button comprises a flange and a pin;
   wherein the microswitch comprises a switch actuator and electrical wiring;
   wherein the trigger pivots about the trigger pivot post away from the switch actuator of the microswitch when actuated by a trigger finger, thereby releasing the switch actuator, which results in a signal flowing through the electrical wiring of the microswitch;
   wherein the trigger pivots about the trigger pivot post into the switch actuator of the microswitch when the trigger is cocked by means of pressing the cocking lever into position;
   wherein the trigger is positioned in either a cocked or fired condition.

2. The activation device of claim 1 including a controller receiving the signal, said controller providing an adjustable delay upon receipt of said signal prior to releasing a transmission brake.

3. The activation device of claim 1 wherein said trigger includes a first notch, and wherein said cocking pressure spring plunger set screw resiliently engages said first notch to releasably hold said trigger in said cocked position.

4. The activation device of claim 3 wherein said trigger includes a second notch, and wherein said cocking pressure spring plunger set screw resiliently engages said second notch to releasably hold said trigger in said fired position.

5. The activation device of claim 3 wherein said trigger tension spring plunger set screw engages a portion of said trigger channel and resiliently holds said trigger in engagement with said micro switch.

6. The activation device of claim 5 wherein compressing said safety switch compresses a portion of said trigger tension spring plunger set screw to disengage said trigger tension spring plunger set screw from said trigger channel such that said trigger can move from microswitch engagement to a microswitch non-engagement position.

7. An activation device for drag racing comprising:
   a body;
   a trigger;
   a cocking pressure spring plunger set screw;
   a trigger tension spring plunger set screw;
   a cocking safety;
   a microswitch;
   wherein the body comprises a trigger pivot post;
   wherein the trigger includes a cocking channel, and a cocking lever;
   wherein the cocking safety comprises a flange and a pin;
   wherein the microswitch comprises a switch actuator and electrical wiring;
   wherein the trigger pivots about the trigger pivot post away from the switch actuator of the microswitch when actuated, thereby releasing the switch actuator, which results in a signal flowing through the electrical wiring of the microswitch;
   wherein the trigger pivots about the trigger pivot post into the switch actuator of the microswitch when the trigger is cocked by pressing the cocking lever into position;
   wherein the trigger is positioned in either a cocked or fired condition.

8. The activation device of claim 7 including a controller receiving the signal from said microswitch, said controller providing a time delay upon receipt of said signal prior to releasing a transmission brake.

9. The activation device of claim 8 wherein said trigger includes a first notch, and wherein said cocking pressure spring plunger set screw resiliently engages said first notch to releasably hold said trigger cocked.

10. The activation device of claim 9 wherein said trigger includes a second notch, and wherein said cocking pressure spring plunger set screw resiliently engages said second notch to releasably hold said trigger in a fired position.

11. The activation device of claim 8 wherein said trigger tension spring plunger set screw engages a portion of said trigger channel and resiliently holds said trigger in engagement with said micro switch.

12. The activation device of claim 11 wherein activating said safety compresses a portion of said trigger tension spring plunger set screw to disengage said trigger tension spring plunger set screw from said trigger channel such that said trigger can move from microswitch engagement to a microswitch non-engagement position.

13. An activation device for drag racing comprising:
   a body;
   a trigger;
   a cocking pressure spring plunger set screw;
   a trigger tension spring plunger set screw;
   a cocking safety;
   a microswitch;
   a trigger pivot post;
   wherein the trigger includes a cocking channel, and a cocking lever;
   wherein the microswitch comprises a switch actuator and electrical wiring;
   wherein the trigger pivots about the trigger pivot post away from the switch actuator of the microswitch when actuated, thereby releasing the switch actuator, which results in a signal from the microswitch;
   wherein the trigger is positioned in either a cocked or fired condition.

14. The activation device of claim 13 including a controller receiving the signal from said microswitch, said controller providing a delay upon receipt of said signal prior to releasing a car from a start line.

15. The activation device of claim 13 wherein said trigger includes a first notch, and wherein said cocking pressure spring plunger set screw resiliently engages said first notch to releasably hold said trigger in a fired position.

16. The activation device of claim 15 wherein said trigger includes a second notch, and wherein said cocking pressure spring plunger set screw resiliently engages said second notch to releasably hold said trigger in a cocked position.

17. The activation device of claim 16 wherein said trigger tension spring plunger set screw engages a portion of said trigger channel and resiliently holds said trigger in engagement with said micro switch.

18. The activation device of claim 17 wherein activating said safety compresses a portion of said trigger tension spring plunger set screw to disengage said trigger tension spring plunger set screw from said trigger channel such that said trigger can move from microswitch engagement to a microswitch non-engagement position.

\* \* \* \* \*